United States Patent
Veine et al.

(10) Patent No.: US 10,342,349 B2
(45) Date of Patent: Jul. 9, 2019

(54) RECLINER MECHANISM HAVING A PAWL SPRING CARTRIDGE

(71) Applicant: Lear Corporation, Southfield, MI (US)

(72) Inventors: Eric Veine, Wixom, MI (US); James S. Wawrzyniak, Warren, MI (US); Peter Robert McCulloch, Grosse Pointe Woods, MI (US)

(73) Assignee: Lear Corporation, Southfield, MI (US)

( * ) Notice: Subject to any disclaimer, the term of this patent is extended or adjusted under 35 U.S.C. 154(b) by 244 days.

(21) Appl. No.: 15/473,095

(22) Filed: Mar. 29, 2017

(65) Prior Publication Data

US 2018/0279784 A1 Oct. 4, 2018

(51) Int. Cl.
  *B60N 2/235* (2006.01)
  *A47C 1/026* (2006.01)

(52) U.S. Cl.
  CPC .............. *A47C 1/026* (2013.01); *B60N 2/236* (2015.04)

(58) Field of Classification Search
  CPC ........ B60N 2/235; B60N 2/2356; A47C 1/026
  USPC ........................................... 297/367 R, 367 P
  See application file for complete search history.

(56) References Cited

U.S. PATENT DOCUMENTS

| | | | |
|---|---|---|---|
| 6,474,740 B1 | 11/2002 | Kondo et al. | |
| 6,675,945 B2 * | 1/2004 | Kim | B60N 2/167 192/223 |
| 8,262,165 B2 | 9/2012 | Mitsuhashi | |
| 8,708,412 B2 * | 4/2014 | Berndtson | B60N 2/236 297/367 L |
| 8,985,689 B2 | 3/2015 | McCulloch et al. | |
| 9,102,248 B2 | 8/2015 | Matt | |
| 9,167,898 B2 | 10/2015 | Wahls et al. | |
| 9,315,121 B2 | 4/2016 | Enokijima et al. | |
| 9,731,633 B2 * | 8/2017 | Veine | B60N 2/235 |
| 10,093,201 B2 * | 10/2018 | Auer | B60N 2/2356 |
| 10,112,507 B2 * | 10/2018 | Maeda | B60N 2/236 |
| 2003/0025377 A1 | 2/2003 | Peters | |
| 2008/0001458 A1 | 1/2008 | Hoshihara et al. | |
| 2009/0243363 A1 | 10/2009 | Tarusawa et al. | |
| 2009/0289488 A1 | 11/2009 | Mitsuhashi | |
| 2010/0308635 A1 * | 12/2010 | Tame | B60N 2/206 297/367 P |
| 2011/0006583 A1 | 1/2011 | Schwarze et al. | |
| 2011/0025114 A1 | 2/2011 | Bemdtson et al. | |
| 2011/0169314 A1 * | 7/2011 | Tanguy | B60N 2/236 297/367 P |
| 2012/0313416 A1 | 12/2012 | Hiemstra | |
| 2014/0091607 A1 | 4/2014 | Maeda | |
| 2014/0097659 A1 | 4/2014 | Wahls et al. | |
| 2014/0239691 A1 | 8/2014 | Hellrung | |

(Continued)

FOREIGN PATENT DOCUMENTS

DE 102005021356 A1 11/2006
WO 2006117330 A1 11/2006

OTHER PUBLICATIONS

United States Patent and Trademark Office, U.S. Appl. No. 14/618,193 (LEAR 53230 PUSP), filed Feb. 10, 2015.

*Primary Examiner* — Chi Q Nguyen
(74) *Attorney, Agent, or Firm* — Brooks Kushman P.C.

(57) ABSTRACT

A recliner mechanism for a seat. The recliner mechanism may have a first plate and a cartridge. The first plate may define a through hole that may receive the cartridge. The cartridge may have a pawl spring slot that may receive a pawl spring that may exert a biasing force on a pawl.

20 Claims, 8 Drawing Sheets

(56) References Cited

U.S. PATENT DOCUMENTS

| | | |
|---|---|---|
| 2015/0015044 A1 | 1/2015 | Teufel et al. |
| 2015/0035339 A1 | 2/2015 | Endou et al. |
| 2015/0069809 A1 | 3/2015 | Matt |
| 2015/0165936 A1 | 6/2015 | Wei et al. |
| 2015/0321585 A1 | 11/2015 | McCulloch et al. |
| 2017/0020289 A1* | 1/2017 | Veine .................... B60N 2/235 |
| 2017/0349064 A1* | 12/2017 | Auer .................... B60N 2/2356 |
| 2018/0162239 A1* | 6/2018 | Smuk .................... B60N 2/235 |

\* cited by examiner

US 10,342,349 B2

RECLINER MECHANISM HAVING A PAWL SPRING CARTRIDGE

TECHNICAL FIELD

This application relates to a recliner mechanism for a seat assembly that has a cartridge that receives pawl springs that exert a biasing force on corresponding pawls.

BACKGROUND

A recliner mechanism is disclosed in U.S. Pat. No. 8,985,689.

SUMMARY

In at least one embodiment, a recliner mechanism is provided. The recliner mechanism may include a first plate, a second plate, a cartridge, a set of pawls, and a set of pawl springs. The first plate may define a through hole and may have a set of pawl guide slots that are disposed adjacent to the through hole. The second plate may be rotatable about an axis with respect to the first plate. The cartridge may be separate component from the first plate and may be received in the through hole. The cartridge may have a set of pawl spring slots. Each member of the set of pawls may be received in a corresponding member of the set of pawl guide slots. Each member of the set of pawl springs may be received in a member of the set of pawl spring slots and may exert a biasing force on a corresponding member of the set of pawls.

In at least one embodiment, a recliner mechanism is provided. The recliner mechanism may include a first plate, a second plate, a cartridge, a pawl, and a pawl spring. The first plate may define a through hole and may have a pawl guide slot that is disposed adjacent to the through hole. The second plate may be rotatable about an axis with respect to the first plate. The cartridge may be a separate component from the first plate and may be received in the through hole. The cartridge may have a pawl spring slot that is spaced apart from the first plate. The pawl may be disposed between the first plate and the second plate. The pawl may be received in the pawl guide slot. The pawl spring may be received in the pawl spring slot. The pawl spring may exert a biasing force on the pawl.

BRIEF DESCRIPTION OF THE DRAWINGS

FIG. 3 is a perspective view of a first plate that may be provided with the recliner mechanism.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
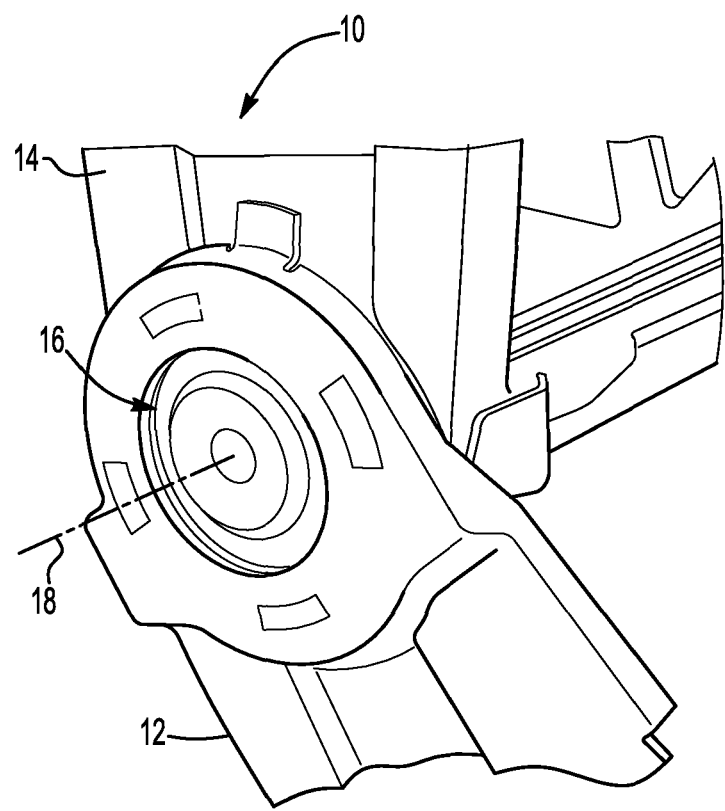
FIG. 1 is a perspective view of a portion of a seat assembly having a recliner mechanism.

Referring to FIG. 1, a portion of a seat assembly 10 is shown. The seat assembly 10 may have a seat bottom 12, a seat back 14, and a recliner mechanism 16. The recliner mechanism 16 may be configured to control pivoting of the seat back 14 about an axis of rotation or axis 18 with respect to the seat bottom 12. One or more recliner mechanisms 16 may be provided with the seat assembly 10. For example, a pair of recliner mechanisms 16 may be disposed along opposing lateral sides of the seat back 14 to selectively permit or inhibit pivoting or rotation of the seat back 14.

Figure 2:
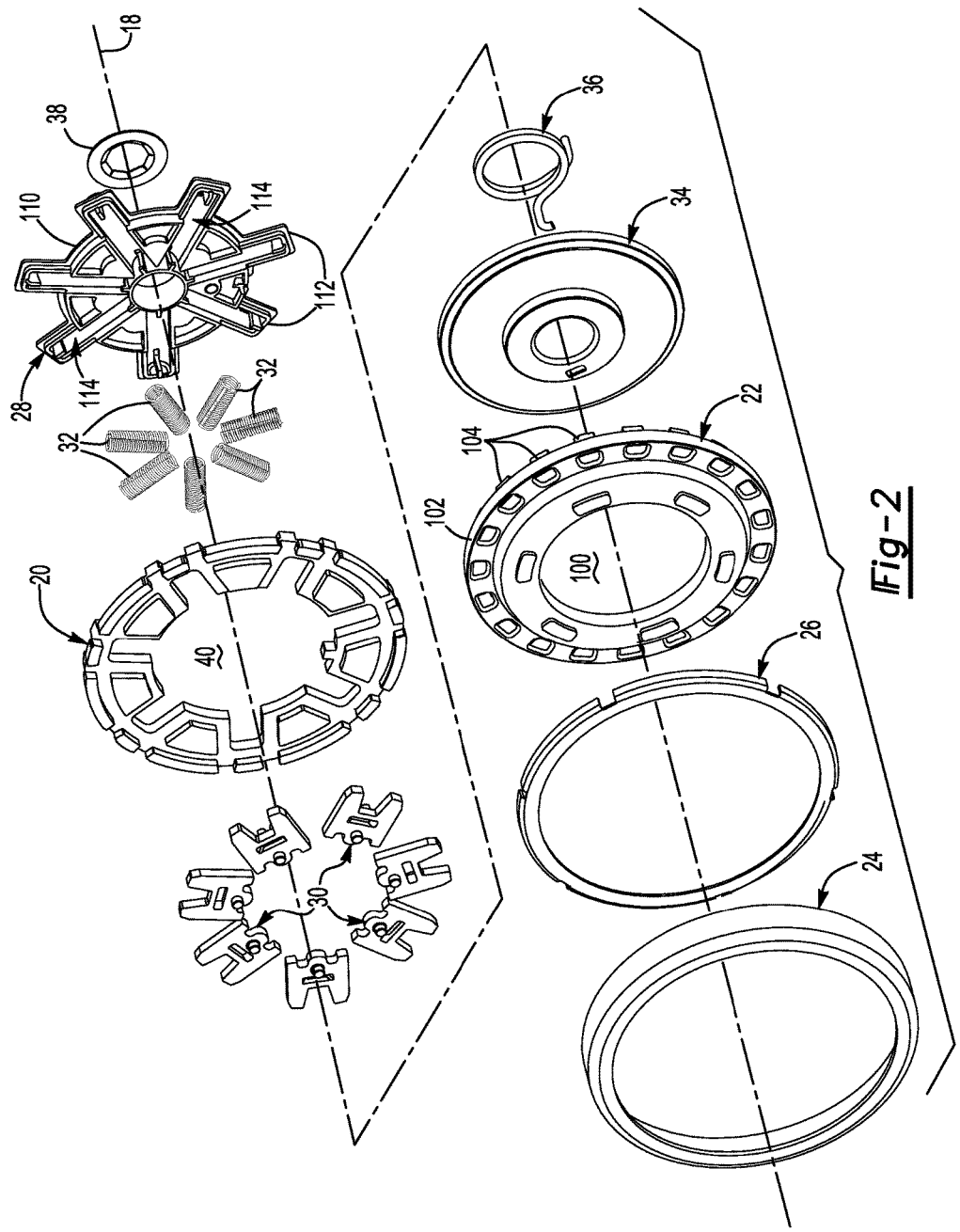
FIGS. 2 and 3 are exploded views of the recliner mechanism.
Figure 3:
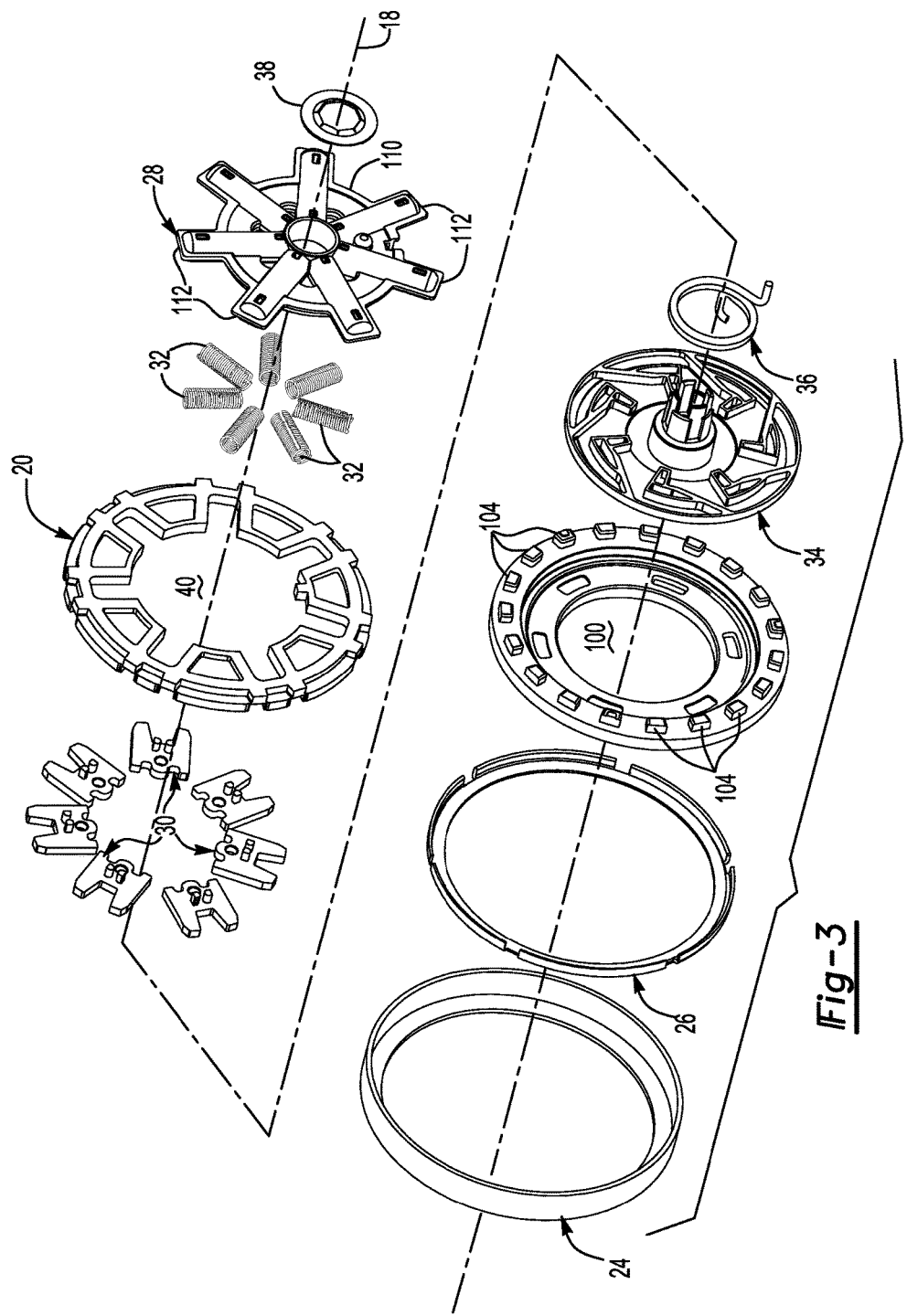

Referring to FIGS. 2 and 3, exploded views of the recliner mechanism 16 are shown. The recliner mechanism 16 may include a first plate 20, a second plate 22, a retainer ring 24, a glide 26, a cartridge 28, a set of pawls 30, a set of pawl springs 32, a driver 34, a biasing member 36, and a clip 38.

Figure 4:
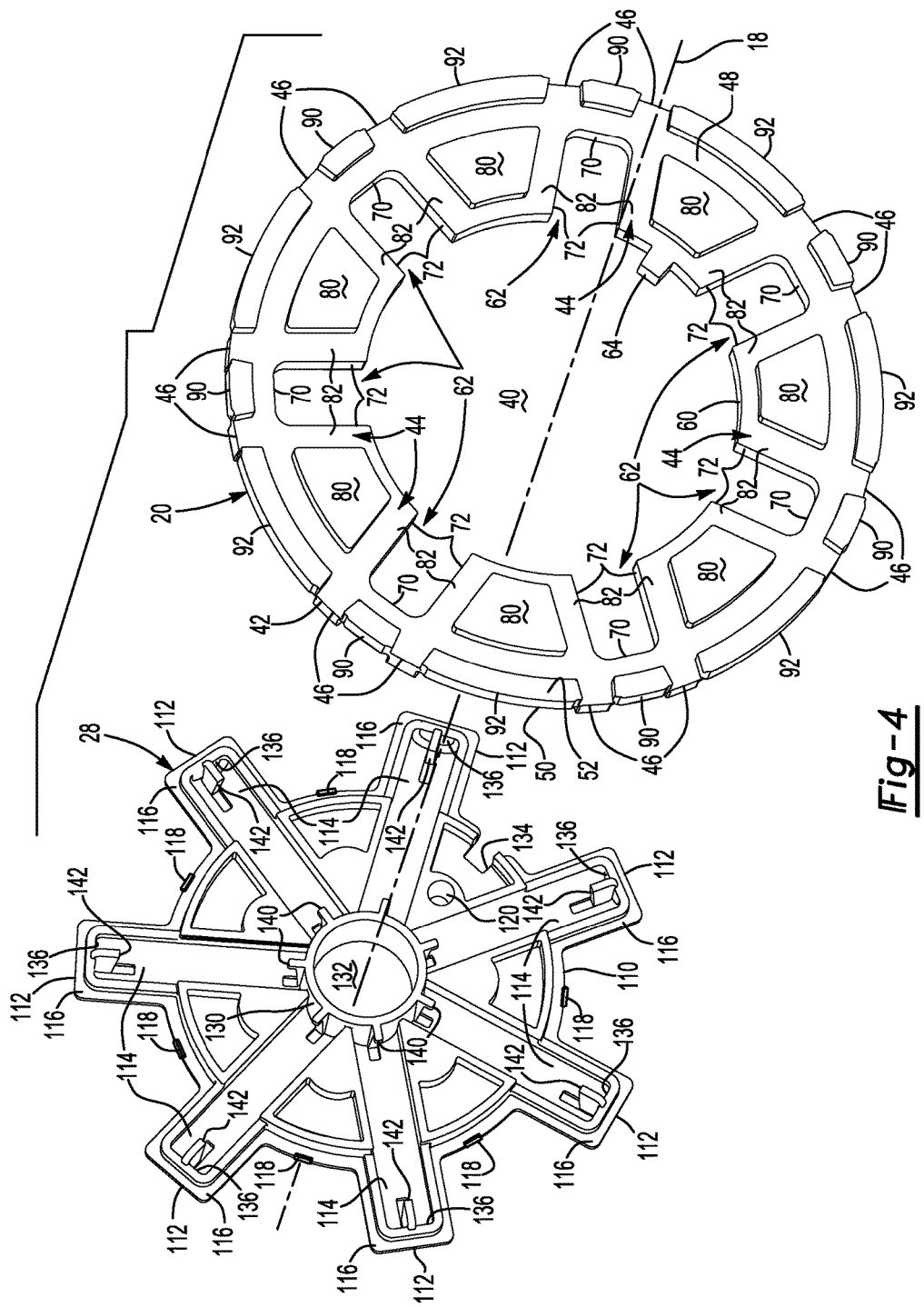
FIG. 4 is an exploded perspective view of a cartridge and a first plate that may be provided with the recliner mechanism.

Referring to FIGS. 2-4, an example of a first plate 20 is shown. The first plate 20 may be adapted to be mounted to the seat assembly 10. For instance, the first plate 20 may be fixedly positioned on or with respect to the seat bottom 12. In at least one configuration, the first plate 20 may be generally configured as a circular disc and may include a through hole 40, an outer surface 42, a set of pawl guide slots 44, a set of pawl tooth openings 46, and a ring groove 48.

Referring to FIG. 4, the through hole 40 may be defined by the first plate 20 and may extend completely through the first plate 20. For example, the through hole 40 may extend from a first side 50 of the first plate 20 that faces away from the second plate 22 to a second side 52 of the first plate 20 that is disposed opposite the first side 50. The through hole 40 may have a center portion 60 and a set of cartridge receiving slots 62.

The center portion 60 may be disposed at the center of the first plate 20. For example, the center portion 60 may be arranged around the axis 18 or may be radially disposed about the axis 18. A protrusion 64 may extend into the center portion 60 of the through hole 40. The protrusion 64 may be received in a corresponding recess in the cartridge 28 to help align the cartridge 28 with the first plate 20 as will be discussed in more detail below.

The set of cartridge receiving slots 62 may extend radially outward from the center portion 60. In the configuration shown in FIG. 4, seven cartridge receiving slots 62 are shown; however, it is contemplated that a greater or lesser number of cartridge receiving slots 62 may be provided. The cartridge receiving slots 62 may be spaced apart from each other and may be arranged in a repeating pattern around the axis 18. Each cartridge receiving slot 62 may be axially positioned or positioned along the axis 18 between the first side 50 and the second side 52 and may extend from the first side 50 to a corresponding pawl guide slot 44. Each cartridge receiving slot 62 may include and may be at least partially defined by an end surface 70 and a pair of side surfaces 72.

The end surface 70 may be disposed at an end of the cartridge receiving slot 62. For example, the end surface 70 may be disposed adjacent to the ring groove 48. The end surface 70 may face toward the axis 18 and may be disposed at a constant radial distance from the axis 18 in one or more embodiments.

A pair of side surfaces 72 may extend from the end surface 70 to the center portion 60 of the through hole 40. The side surfaces 72 may be disposed opposite each other and may be disposed substantially parallel to each other in one or more embodiments.

The outer surface 42 may be disposed opposite the through hole 40 and may face away from the axis 18 and toward the retainer ring 24. In at least one configuration, the outer surface 42 may be radially disposed with respect to the axis 18 and may at least partially define an outside circumference of the first plate 20.

The set of pawl guide slots 44 may be provided in the second side 52 of the first plate 20 that faces toward the second plate 22. In FIG. 4, seven pawl guide slots 44 are shown, although it is contemplated that a different number of pawl guide slots 44 may be provided. Each pawl guide slot 44 may be configured to receive and guide movement of a corresponding pawl 30. The pawl guide slots 44 may be disposed between the center portion 60 of the through hole 40 and the ring groove 48 and may extend radially with respect to the axis 18. As such, the pawl guide slots 44 may be disposed adjacent to the through hole 40 and may extend from the ring groove 48 toward the through hole 40. In at least one configuration, the pawl guide slots 44 may be spaced apart from each other and may be located between one or more guide features 80 that may extend from the first plate 20. The guide features 80 may extend in an axial direction toward the second plate 22. Adjacent pairs of guide features 80 may at least partially define an associated pawl guide slot 44 therebetween. Moreover, a support surface 82 may extend from a guide feature 80 toward the cartridge receiving slot 62 that is disposed between an adjacent pair of guide features 80. For example, the support surface 82 may extend from the guide feature 80 to a side surface 72 of a cartridge receiving slot 62. As such, the support surface 82 may support a pawl 30 that is received in the pawl guide slot 44.

The set of pawl tooth openings 46 may be arranged such that each pawl tooth opening 46 is aligned with a corresponding pawl guide slot 44. For example, a pawl tooth opening 46 may be disposed on the opposite side of the ring groove 48 from each pawl guide slot 44. Each pawl tooth opening 46 may be disposed proximate or adjacent to the outer surface 42 of the first plate 20 and may extend inwardly to or toward the ring groove 48. For instance, the pawl guide slots 44 may extend from the ring groove 48 toward or to the outer surface 42. In the configuration shown, two pawl tooth openings 46 are aligned with each pawl guide slot 44 and disposed on the opposite sides of a first spacer tooth 90; however, it is contemplated that a greater or lesser number of pawl guide slots 44 and/or spacer teeth may be provided. Each pawl tooth opening 46 may be configured to receive a corresponding locking pin or locking tooth on a pawl 30 when the pawl 30 is fully extended away from through hole 40 as will be discussed in more detail below. In addition, a second spacer tooth 92 may be provided between pawl tooth openings 46. The second spacer tooth 92 may be wider or larger than the first spacer tooth 90.

The ring groove 48 may receive teeth that extend from the second plate 22. The ring groove 48 may be configured as a ring that may extend around the axis 18 and around the through hole 40. For example, the ring groove 48 may be radially disposed with respect to the axis 18 and may extend continuously around the axis 18 and the through hole 40. The ring groove 48 may be disposed between the through hole 40 and the outer surface 42. In FIG. 4, the ring groove 48 is disposed between each pawl guide slot 44 and the set of pawl tooth openings 46. As such, the ring groove 48 may be disposed adjacent to and may intersect or extend from each pawl guide slot 44 and corresponding members of the set of pawl tooth openings 46.

Referring to FIGS. 2 and 3, an example of a second plate 22 is shown. The second plate 22 may be rotatable around the axis 18 with respect to the first plate 20. In at least one configuration, the second plate 22 may include a center hole 100, an outside surface 102, a set of teeth 104.

The center hole 100 may receive the driver 34 such that the driver 34 may be rotatable about the axis 18. In at least one configuration, the center hole 100 may be disposed at the center of the second plate 22 and may be radially disposed about the axis 18. The center hole 100 may be a through hole that may extend through the second plate 22.

The outside surface 102 may be disposed opposite the center hole 100 and may face toward the retainer ring 24. In at least one configuration, the outside surface 102 may be radially disposed with respect to the axis 18 and may at least partially define an outside diameter or outside circumference of the second plate 22. The second plate 22 may have a smaller diameter than the first plate 20.

The set of teeth 104 may be disposed between the outside surface 102 and the center hole 100. For instance, the teeth 104 may be disposed proximate or may be spaced apart from the outside surface 102 and may extend in an axial direction toward the first plate 20. As such, the set of teeth 104 may extend generally parallel to the axis 18 and may be disposed at a constant radial distance from the axis 18. The teeth 104 may be spaced apart from each other and provided in repeating arrangement around the axis 18. For example, the teeth 104 may be received in the ring groove 48 of the first plate 20. For clarity, only a portion of the set of teeth 104 are labeled in FIGS. 2 and 3.

Referring to FIGS. 2 and 3, the retainer ring 24 may help retain the second plate 22 between the first plate 20 and the retainer ring 24. For example, the retainer ring 24 may be fixedly disposed on the first plate 20 and may not be fixedly disposed on the second plate 22. As such, the second plate 22 may be received between the retainer ring 24 and the first plate 20 and may be rotatable about the axis 18 with respect to the retainer ring 24 and first plate 20. The retainer ring 24 may be fixedly disposed on the first plate 20 in any suitable manner, such as by welding, an interference fit, or by the use of one or more fasteners.

Referring to FIGS. 2 and 3, the glide 26 may be received in the retainer ring 24 and may be located between the retainer ring 24 and the second plate 22. The glide 26 may act as a spacer that may separate the second plate 22 from the retainer ring 24. The glide 26 may be configured as a ring and may be made of a polymeric material like nylon. In at least one configuration, the glide 26 may have a generally L-shaped cross section that may extend partially around the outer circumference of the second plate 22 to help radially position the glide 26.

Referring to FIGS. 2-4, the cartridge 28 is a separate component from the first plate 20 and is received in the through hole 40 of the first plate 20. The cartridge 28 may be made of a different material than the first plate 20. For example, the cartridge 28 may be made of a polymeric material while the first plate 20 may be made of a metal or metal alloy. As such, the cartridge 28 may reduce the weight of the recliner mechanism 16 as compared to a recliner mechanism that does not receive a cartridge 28. In at least one configuration, the cartridge 28 may have a body 110, a set of arms 112, a set of pawl spring slots 114, a mounting flange 116, one or more retention features 118, and a mounting hole 120.

Figure 5:
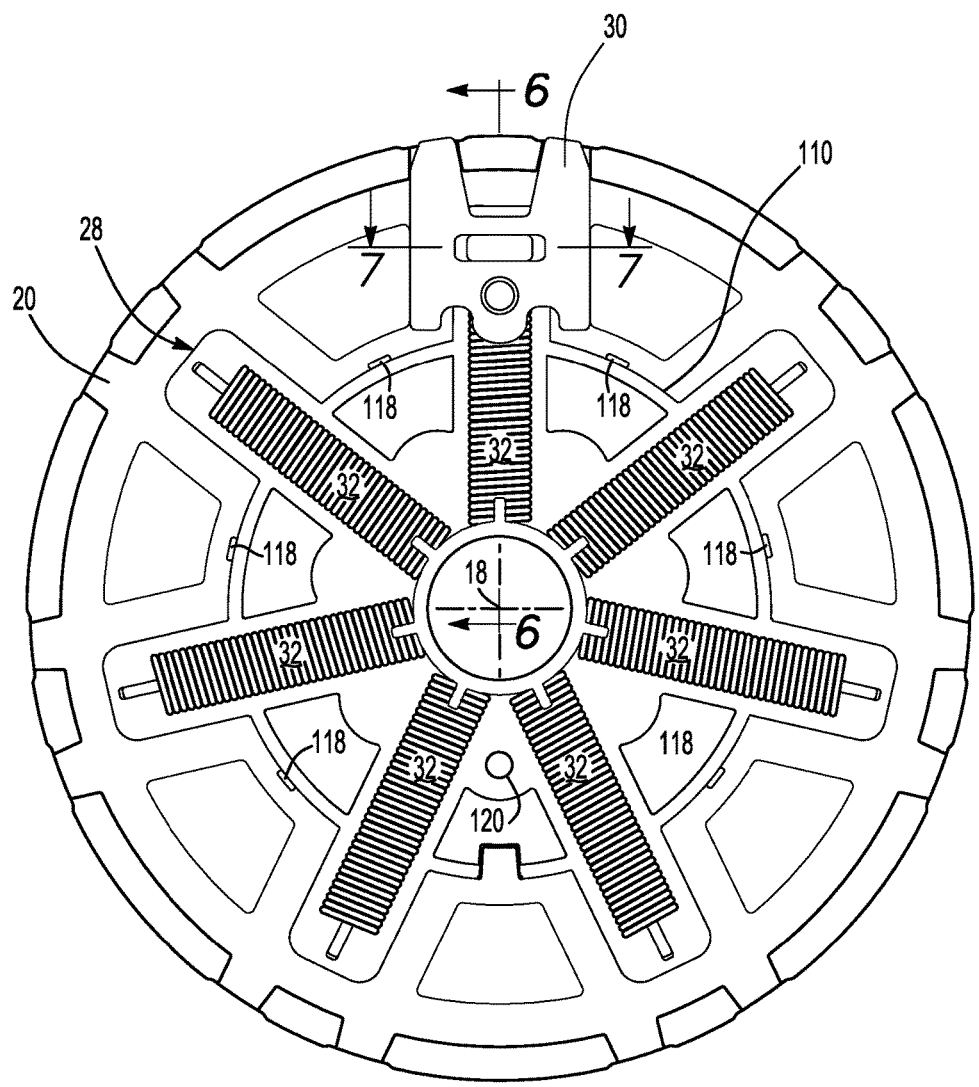
FIG. 5 is a side view of the recliner mechanism showing the cartridge received in the first plate, a plurality of pawl springs received in the cartridge, and a pawl.

Referring to FIGS. 4 and 5, the body 110 may be received in the center portion 60 of the through hole 40. For instance, the body 110 may have a shape that is compatible with the shape of the center portion 60 and may engage one or more surfaces of the first plate 20 that define the center portion 60. As is best shown in FIG. 4, the body 110 may have a generally circular configuration. In at least one configuration, the body 110 may include an inner wall 130, a cartridge through hole 132, and a recess 134.

The inner wall 130 may extend around the axis 18. For example, the inner wall 130 may be configured as a ring that that may extend continuously around the axis 18 and may be disposed at a radial distance with respect to the axis 18. The inner wall 130 may define or may be disposed at an end of the pawl spring slots 114. The inner wall 130 may define the cartridge through hole 132.

The cartridge through hole 132 may extend through the cartridge 28. The driver 34 may extend through the cartridge through hole 132.

The recess 134 may receive the protrusion 64 of the first plate 20. The recess 134 may extend toward the axis 18 and may be disposed between and adjacent pair of arms 112 in one or more configurations. The cartridge 28 may be seated in the through hole 40 of the first plate 20 when the protrusion 64 is aligned with and received in the recess 134. As such, the protrusion 64 and the recess 134 may cooperate to orient the cartridge 28 in a desired rotational position about the axis 18 with respect to the first plate 20.

The set of arms 112 may extend radially outward from the body 110. In the configuration shown, seven arms 112 are shown; however, it is contemplated that a greater or lesser number of arms 112 may be provided. The arms 112 may be spaced apart from each other and may be arranged around the axis 18. Each arm 112 may be at least partially received in a corresponding cartridge receiving slot 62. As such, the arms 112 may engage the first plate 20 in their corresponding cartridge receiving slots 62 to inhibit rotation of the cartridge 28 about the axis 18 with respect to the first plate 20.

A set of pawl spring slots 114 may be defined by the cartridge 28. In the configuration shown, seven pawl spring slots 114 are shown; however, it is contemplated that a greater or lesser number of pawl spring slots 114 may be provided. Each pawl spring slot 114 may be defined by the body 110 and a corresponding arm 112. Each pawl spring slot 114 may be defined in the cartridge 28 such that the pawl spring slot 114 is spaced apart from and does not engage the first plate 20. Each pawl spring slot 114 may receive and help retain a corresponding pawl spring 32. Each pawl spring slot 114 may be configured as a recess in the cartridge 28 that may extend radially outward with respect to the axis 18. For example, the pawl spring slots 114 may extend between the inner wall 130 and the end surface 70 of a cartridge receiving slot 62.

Figure 7:
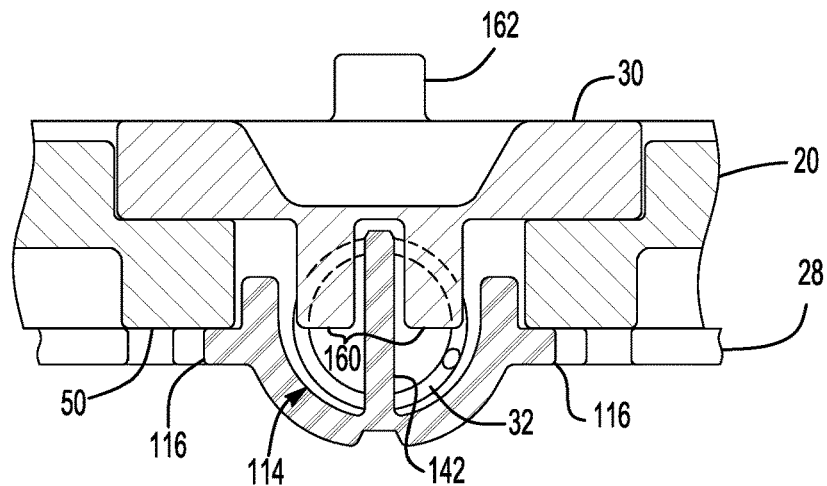
FIG. 7 is a section view of a portion of the recliner mechanism along section line 7-7.

Each pawl spring slot 114 may extend in a radial direction from the inner wall 130 to an outer wall 136 that may be disposed opposite the inner wall 130. As such, the pawl spring slot 114 may terminate at the outer wall 136. The outer wall 136 may engage the end surface 70 of the cartridge receiving slot 62. In addition, each pawl spring slot 114 may have a cross section that is compatible for receiving the pawl spring 32. For instance, each pawl spring slot 114 may have a curved or generally U-shaped cross-section when viewed along a radius that extends from the axis 18 as is best shown in FIG. 7.

Figure 6:
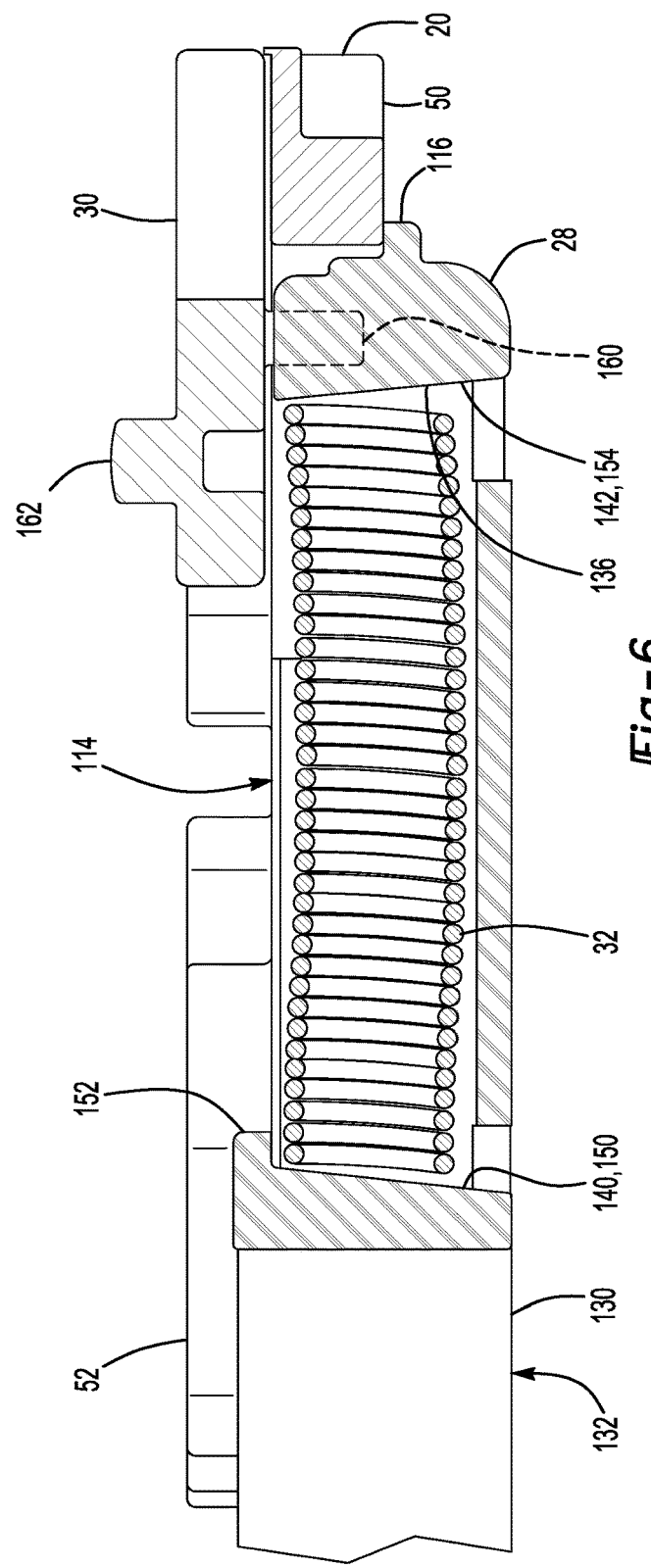
FIG. 6 is a section view of a portion of the recliner mechanism along section line 6-6.

Referring to FIGS. 4 and 6, a first pawl spring retaining feature 140 and a second pawl spring retaining feature 142 may be associated with a pawl spring slot 114.

The first pawl spring retaining feature 140 may extend from the inner wall 130. For example, the first pawl spring retaining feature 140 may extend away from the axis 18. The first pawl spring retaining feature 140 may include a first angled end surface 150 that may face away from the axis 18 and may be disposed in a nonparallel relationship with the axis 18. For example, the first angled end surface 150 may extend progressively further from the axis 18 and from the inner wall 130 as the first angled end surface 150 extends further from the bottom of the pawl spring slot 114 and toward the second plate 22. Optionally or in addition, the first pawl spring retaining feature 140 may include a hook 152 that may extend over an associated pawl spring 32. For instance, the hook 152 may be disposed at an end of the first pawl spring retaining feature 140 and may extend further from the axis 18 than the first angled end surface 150. As such, the hook 152 may be axially positioned between the pawl spring 32 and the second plate 22. The first angled end surface 150 and/or the hook 152 of the first pawl spring retaining feature 140 may extend over and may engage a first end of a pawl spring 32 and help retain the pawl spring 32 in the pawl spring slot 114. In addition, the first angled end surface 150 of the first pawl spring retaining feature 140 may cause the pawl spring 32 to bow away from the first plate 20, such as when the pawl spring 32 extends from the first pawl spring retaining feature 140 to the second pawl spring retaining feature 142 as shown in FIG. 6.

The second pawl spring retaining feature 142 may extend from the outer wall 136. The second pawl spring retaining feature 142 may extend toward the axis 18 and may extend over an associated pawl spring 32. For instance, the second pawl spring retaining feature 142 may include a second angled end surface 154 that may face toward the axis 18 and may be disposed in a nonparallel relationship with the axis 18. The second angled end surface 154 may extend progressively closer to the axis 18 or closer to the first angled end surface 150 as the second angled end surface 154 extends further from the bottom of the pawl spring slot 114 and toward the first plate 20 and the second plate 22. The second pawl spring retaining feature 142 may extend over and may engage a second end of the pawl spring 32 that may be disposed opposite the first end of the pawl spring 32. As such, the second pawl spring retaining feature 142 may help retain the pawl spring 32 in the pawl spring slot 114. For instance, the second angled end surface 154 of the second pawl spring retaining feature 142 may cause the pawl spring 32 to bow as shown in FIG. 6. Optionally or in addition, the second pawl spring retaining feature 142 may include a hook as previously described.

The bottom of a pawl spring slot 114 may be provided in various configurations. In FIG. 6, the bottom of the pawl spring slot extends in a substantially linear manner between the inner wall 130 and the outer wall 136. It is also contemplated that the bottom of a pawl spring slot 114 may extend along a curve or an arc between the inner wall 130 and the outer wall 136 such that the bottom may be concave in a direction that faces toward a pawl spring 32. A curved or arcuate configuration may accommodate bowing of the pawl spring 32 and may help improve retention of the pawl spring 32 in the pawl spring slot 114.

Referring to FIGS. 4 and 6, a mounting flange 116 may extend outwardly from the pawl spring slot 114. For example, the mounting flange 116 may extend from one or more sides of the pawl spring slot 114 in a direction that extends away from the pawl spring slot 114. In the configuration shown, the mounting flange 116 extends away from the pawl spring slot 114 in multiple directions such that the mounting flange 116 is disposed on the first side 50 of the first plate 20 and extends over the end surface 70 and side surfaces 72 of a corresponding cartridge receiving slot 62. As such the mounting flange 116 may inhibit axial movement of the cartridge 28 toward the second plate 22.

Referring to FIGS. 4, and 5, one or more retention features 118 may be provided with the cartridge 28. The retention features may inhibit axial movement of the cartridge 28 in a direction that extends away from the second plate 22. The retention features 118 may have any suitable configuration. For example, the retention features 118 may be configured as protrusions, such as snap tabs, that may hook over the second side 52 of the first plate 20. The retention features 118 may be provided in any suitable location. For example, one or more retention features 118 may extend from the body 110 of the cartridge 28, from an arm 112 of the cartridge 28, or combinations thereof.

The mounting hole 120 may facilitate mounting of the biasing member 36. For example, the mounting hole 120 may receive a first end of the biasing member 36. The mounting hole 120 may extend partially or completely through the cartridge 28.

Referring to FIGS. 2, 3 and 6-9, the set of pawls 30 will now be described in more detail. The pawls 30 may be disposed between the first plate 20 and the second plate 22. Each pawl 30 may be received in a corresponding pawl guide slot 44 and may be configured to move along a radial line between a retracted position and a fully extended position. In the retracted position, a pawl 30 may be actuated toward the axis 18 to permit the second plate 22 to rotate with respect to the first plate 20. In the fully extended position, a pawl 30 may be actuated away from the axis 18 to inhibit rotation of the second plate 22 about the axis 18 with respect to the first plate 20 as will be discussed in more detail below. Each pawl 30 may include at least one spring pin 160, a cam pin 162, and a pair of locking pins 164.

Figure 9:
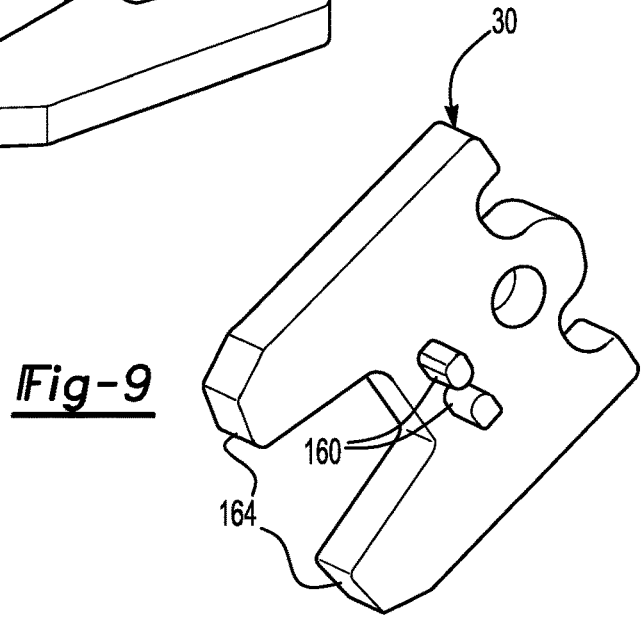

Referring to FIGS. 6, 7 and 9. at least one spring pin 160 may be disposed near the center of each pawl 30 and may extend toward the first plate 20. In the configuration shown in FIG. 9, a pair of spring pins 160 are provided that are spaced apart from each other and extend substantially parallel to each other. The spring pins 160 may extend into a corresponding pawl spring slot 114 such that the spring pins 160 may engage an end of a corresponding pawl spring 32. Moreover, the spring pins 160 may be disposed on opposite sides of the second pawl spring retaining feature 142 during assembly as will be discussed in more detail below.

Figure 8:
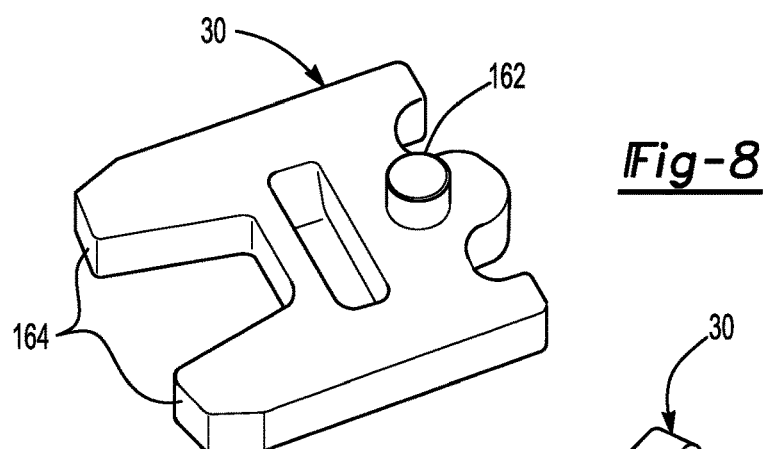
FIGS. 8 and 9 are perspective views of a pawl.

Referring to FIGS. 6-8, the cam pin 162 may extend toward the second plate 22 or in an opposite direction from the spring pin 160. The cam pin 162 may be disposed near the center of each pawl 30 or along a center axis of each pawl 30 with respect to the axis 18. The cam pin 162 may be disposed closer to the axis 18 than the spring pin 160. The cam pin 162 of each pawl 30 may engage the driver 34. For example, each cam pin 162 may extend into a corresponding pawl actuation opening of the driver 34 where it may engage one or more surfaces of the driver 34 that define the pawl actuation opening. From the perspective shown in FIG. 5, rotation of the driver 34 in a clockwise direction about the axis 18 may retract the pawls 30 toward the axis 18. More specifically, sufficient clockwise rotation of the driver 34 may cause the cam pin 162 of any extended pawl 30 to follow at least one ramp surface of the pawl actuation opening, thereby actuating the pawl 30 toward the axis 18 as will be discussed in more detail below. It is also contemplated that the recliner mechanism 16 may be configured such that rotation of the driver 34 in a counterclockwise direction about the axis 18 may retract the pawls 30 toward the axis 18. Moreover, the seat assembly 10 may have two recliner mechanisms that are disposed proximate opposite lateral sides of the seat back 14 in which one recliner mechanism employs clockwise driver rotation to retract the pawls 30 and another recliner mechanism employs counterclockwise driver rotation to retract the pawls 30.

Referring to FIGS. 5, 8 and 9, a pair of locking pins 164 may extend from an end of a pawl 30 in a direction that extends away from the axis 18. The locking pins 164 may be spaced apart from each other and may have a tapered configuration in which the locking pins 164 are narrower near an end of the pawl 30 that faces away from the axis 18 than near an intermediate surface that may extend between the locking pins 164. The locking pins 164 may also be provided with a master pin/slave pin configuration as discussed in U.S. Pat. No. 8,985,689, which is hereby incorporated by reference in its entirety.

Referring to FIGS. 2, 3, 5 and 6, each pawl spring 32 or each member of the set of pawl springs 32 may independently exert a biasing force or urge a corresponding pawl 30 in a direction that extends away from the axis 18. Each pawl spring 32 may be received in a corresponding pawl spring slot 114 and may have a first end that may engage the spring pin 160 once the recliner mechanism 16 is assembled and a second end that may engage the first pawl spring retaining feature 140.

Figure 10:
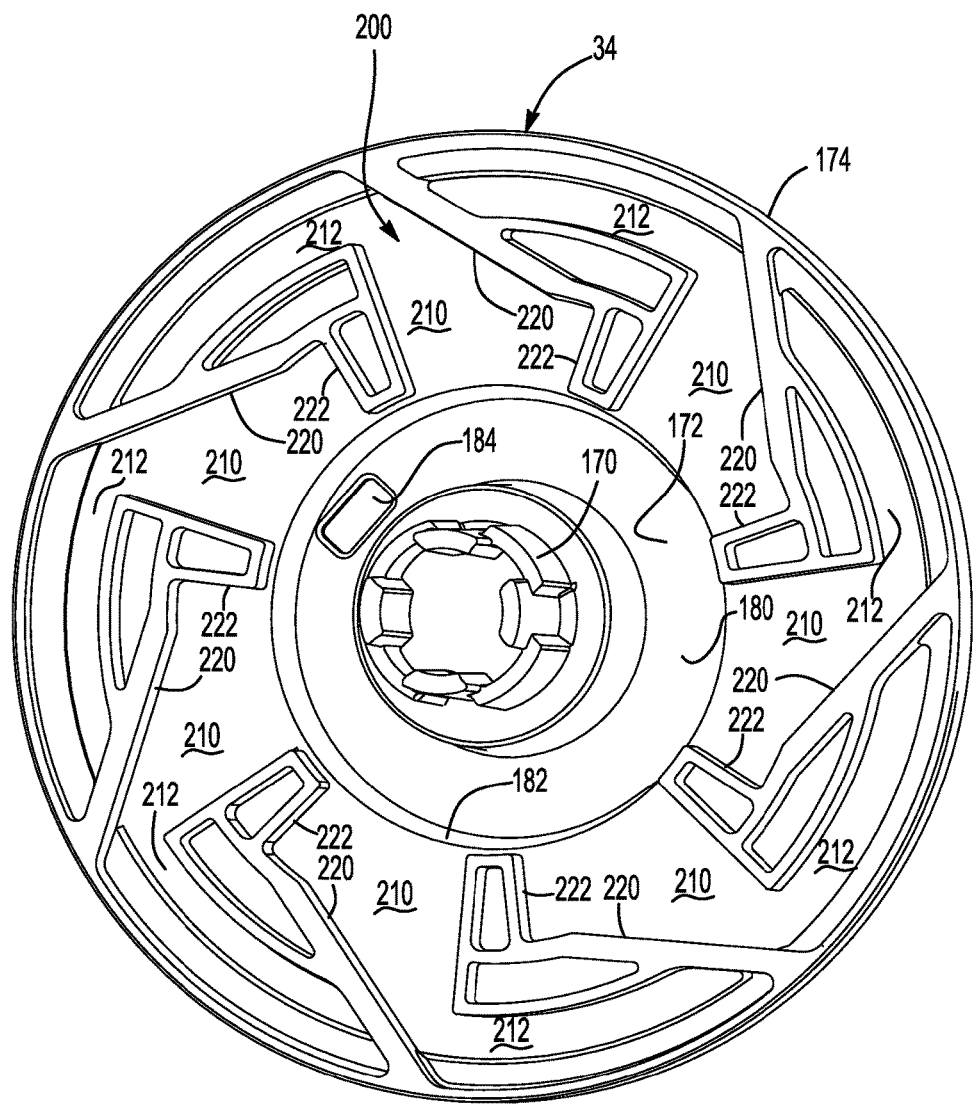
FIG. 10 is a magnified perspective view of a driver of the recliner mechanism.

Referring to FIGS. 2, 3, and 10, the driver 34 may be configured to rotate about the axis 18 to actuate the pawls 30 as will be discussed in more detail below. The driver 34 may be provided as a single unitary or one-piece component that may directly actuate the pawls 30 without any intervening component, such as a cam disc. For example, the driver 34 may be single component that may be made of a polymeric material or a metal alloy, such as a cast metal alloy. The driver 34 may be partially received in and may extend through the cartridge through hole 132 of the cartridge 28. The driver 34 may also be at least partially received in the center hole 100 of the second plate 22. In at least one configuration, the driver 34 may include a shaft portion 170, a cover portion 172, and a flange portion 174.

Referring to FIG. 10, the shaft portion 170 may be disposed proximate the center of the driver 34. The shaft portion 170 may generally extend through the recliner mechanism 16. For example, the shaft portion 170 may be received in the cartridge through hole 132 of the cartridge 28 and the center hole 100 of the second plate 22. The shaft portion 170 may be disposed around the axis 18 and may define a center hole. The center hole may extend along the axis 18 and may receive an input shaft that may rotate the driver 34 about the axis 18.

The cover portion 172 may extend outwardly from the shaft portion 170. The cover portion 172 may be at least partially disposed in the center hole 100 of the second plate 22, but may not be disposed in the through hole 40 of the first plate 20. In at least one configuration, the cover portion 172 may include a first cover portion wall 180 and a second cover portion wall 182.

The first cover portion wall 180 may extend from the shaft portion 170. For example, the first cover portion wall 180 may be disposed in the center hole 100 of the second plate 22 and may extend from the shaft portion 170 in a direction that extends away from the axis 18. In at least one configuration, the first cover portion wall 180 may extend substantially perpendicular with respect to the axis 18 from an end of the shaft portion 170. The first cover portion wall 180 may include a cover portion mounting hole 184. The cover portion mounting hole 184 may receive an end of the biasing member 36. The cover portion mounting hole 184 may be disposed between the shaft portion 170 and the second cover portion wall 182.

The second cover portion wall 182 may extend from the first cover portion wall 180 to the flange portion 174. For example, the second cover portion wall 182 may extend from an end of the first cover portion wall 180 to an end of the flange portion 174. The second cover portion wall 182 may extend around the axis 18 in a ring-like manner and may be disposed substantially perpendicular to the first cover portion wall 180 and the flange portion 174 in one or more configurations. The second cover portion wall 182 may be disposed proximate and may engage a surface of the second plate 22 that may define the center hole 100 and may be spaced apart from the shaft portion 170 to help define a cavity that may receive the biasing member 36.

The flange portion 174 may extend from the cover portion 172. For example, the flange portion 174 may extend from an end of the cover portion 172 in an outward direction that may extend away from the axis 18 and toward the set of teeth 104 of the second plate 22. The flange portion 174 may be disposed between the first plate 20 and the second plate 22 and may have a set of pawl actuation openings 200.

The pawl actuation openings 200 may be arranged around the axis 18 and may be positioned between the second cover portion wall 182 and an outside surface or outside circumferential surface of the flange portion 174. Each member of the set of pawl actuation openings 200 may receive a cam pin 162 of a corresponding member of the set of pawls. Moreover, each pawl actuation opening 200 may be configured to guide movement a corresponding pawl 30 when the driver 34 is rotated about the axis 18, such as when a pawl 30 is retracted.

The pawl actuation opening 200 may have a first opening portion 210 and a second opening portion 212. The first opening portion 210 may include a ramp surface 220 and a stop surface 222.

The ramp surface 220 may engage a cam pin 162 and guide movement of a corresponding pawl 30 as the driver rotates. For instance, the cam pin 162 may slide along the ramp surface 220 toward the stop surface 222 as the driver 34 rotates about the axis 18 in a first direction and may slide along the ramp surface 220 in the opposite direction as the driver 34 rotates about the axis 18 in a second direction.

The stop surface 222 may be disposed at an end of the ramp surface 220. The stop surface 222 may limit movement of the pawls 30 toward the retracted position. More specifically, the cam pins 162 of the pawls 30 may engage the stop surface 222 when the driver 34 is rotated to move the pawls 30 to the fully retracted position. The stop surface 222 may extend along a radial line with respect to the axis 18 in one or more configurations.

The second opening portion 212 may extend from the first opening portion 210. The second opening portion 212 may be disposed near the outside circumference of the driver 34 and may be configured as an elongated slot that may receive the cam pin 162 during assembly of the recliner mechanism 16. The cam pin 162 may be initially received in the second opening portion 212 during assembly and may exit the second opening portion 212 and enter the first opening portion 210 during the assembly process. As such, the second opening portion 212 may not receive a cam pin 162 after the recliner mechanism 16 is fully assembled.

Referring to FIGS. 2 and 3, the biasing member 36 may be disposed between the cartridge 28 and the driver 34. In at least one configuration, the biasing member 36 may be configured as a coil spring that may extend around the shaft portion 170.

The biasing member 36 may exert a biasing force on the driver 34 that may bias the driver 34 in a clockwise direction about the axis 18 from the perspective shown in FIG. 5. The biasing member 36 may have a first end and a second end. The first end may be coupled to the cartridge 28. For example, the first end may be received in the mounting hole 120 in the cartridge 28. The second end of the biasing member 36 may be disposed opposite the first end. The second end may be coupled to the cover portion 172. For example, the second end may be received in the cover portion mounting hole 184 of the driver 34. As noted above, it is also contemplated that the recliner mechanism 16 may be configured such that rotation of the driver 34 in a counterclockwise direction about the axis 18 may retract the pawls 30 toward the axis 18. In such a configuration, the biasing member 36 may bias the driver 34 in a counterclockwise direction about the axis 18. Moreover, the seat assembly 10 may have two recliner mechanisms that are disposed proximate opposite lateral sides of the seat back 14 in which the biasing member of one recliner mechanism biases a driver 34 in a clockwise direction and the biasing member of the other recliner mechanism biases its associated driver 34 in a clockwise direction.

The clip 38 may secure the driver 34 to the recliner mechanism 16. The clip 38 may be configured as a ring that may receive an end of the driver 34. The clip 38 may inhibit axial movement of the driver 34 while permitting the driver 34 to rotate about the axis 18.

Referring to FIGS. 6 and 7, the positioning of a pawl 30 and the spring pins 160 during assembly of the recliner mechanism 16 is shown. An example of an assembly sequence is discussed below.

The cartridge 28 may be aligned with and inserted in an axial direction into the through hole 40 in the first plate 20 such that the cartridge 28 enters the through hole 40 from the first side 50 of the first plate 20. Relative axial movement may terminate when the mounting flange 116 of the cartridge 28 engages the first side 50 of the first plate 20 and/or when the retention features 118 secure the cartridge 28 to the first plate 20.

The pawl springs 32 may be inserted into the pawl spring slots 114 either before or after the cartridge 28 is assembled to the first plate 20. Opposing ends of each pawl spring 32 may be held in an associated pawl spring slot 114 by the first pawl spring retaining feature 140 and the second pawl spring retaining feature 142 as previously described.

Next, the pawls 30 may be inserted into the pawl guide slots 44 in the first plate 20 such that each pawl 30 is disposed proximate the outer surface 42 of the first plate 20. As such, the spring pins 160 of a pawl 30 may be disposed on opposite sides of the second pawl retaining feature 142 as shown in FIG. 7. The spring pins 160 may be spaced apart from end of the pawl spring 32 (e.g., beyond the working range of the pawl spring 32) so that the pawl spring 32 does not exert a biasing force or a load force on the pawl 30 to make assembly easier. The locking pins 164 of a pawl 30 may extend outwardly past the outer surface 42 during this assembly step.

Next, the biasing member 36 may be aligned and positioned on the cartridge 28 such that an end of the biasing member 36 is coupled to or received in the mounting hole 120 of the cartridge 28.

The driver 34 may be aligned with and inserted into the cartridge through hole 132 and secured with the clip 38. The driver 34 may receive the cam pins 162. In addition, an end of the biasing member 36 may be received in the cover portion mounting hole 184 of the driver 34. The driver 34 may be rotated about the axis 18 to retract the pawls 30 such that the spring pins 160 engage the end of a corresponding pawl spring 32. For example, the driver 34 may be rotated to move the pawls 30 to the fully retracted position. The second plate 22 may then be aligned with and installed on the first plate 20.

The glide 26 and the retainer ring 24 may then be subsequently installed on the second plate 22. The retainer ring 24 may be fixedly secured to the first plate 20.

Operation of an assembled recliner mechanism 16 will now be discussed. As an overview, the second plate 22 may rotate about the axis 18 with respect to the first plate 20 when the pawls 30 are in a retracted position. The pawls 30 may be moved to the retracted position by rotating the driver 34 in a direction that causes the cam pins 162 slide along the ramp surface 220 toward or to the stop surface 222. Thus, the force exerted by the driver 34 may overcome the biasing force of the pawl springs 32 and retract the pawls 30 such that the locking pins 164 of the pawls 30 do not extend between teeth 104 on the second plate 22 that are received in the ring groove 48 of the first plate 20.

Extending the pawls 30 may be accomplished by allowing the driver 34 to rotate in the opposite direction than was employed to retract the pawls 30. The pawls 30 may move from the retracted position and away from the axis 18 toward a fully extended position to inhibit or prevent the second plate 22 from rotating about the axis 18 with respect to the first plate 20 when the driver 34 is permitted to rotate in the opposite direction about the axis 18. The biasing member 36 may exert a biasing force that may rotate the driver 34 in the opposite direction. At least one pawl 30 may move to a fully extended position in which the locking pins 164 extend between teeth 104 on the second plate 22 and into pawl tooth openings 46 on the first plate 20. At least one other pawl may move to a partially extended position in which its locking pins 164 extend between teeth 104 on the second plate 22 but not into pawl tooth openings 46 on the first plate 20 due to a lack of alignment of at least one locking pin 164 and a pawl tooth opening 46. More detailed examples of pawl positions are discussed in U.S. Pat. No. 8,985,689.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism comprising:
   a first plate that defines a through hole and has a set of pawl guide slots disposed adjacent to the through hole;
   a second plate that is rotatable around an axis with respect to the first plate;
   a cartridge that is a separate component from the first plate and is received in the through hole, the cartridge having a set of pawl spring slots;
   a set of pawls, wherein each member of the set of pawls is received in a corresponding member of the set of pawl guide slots; and
   a set of pawl springs, wherein each member of the set of pawl springs is received in a member of the set of pawl spring slots and exerts a biasing force on a corresponding member of the set of pawls.

2. The recliner mechanism of claim 1 wherein the through hole has a center portion that is arranged around the axis and a set of cartridge receiving slots that extend radially outward from the center portion.

3. The recliner mechanism of claim 2 wherein the first plate has a ring groove that extends around the through hole, wherein each member of the set of cartridge receiving slots has an end surface that is disposed adjacent to the ring groove.

4. The recliner mechanism of claim 3 wherein each member of the set of cartridge receiving slots is defined by the end surface and a pair of side surfaces that extend from the end surface to the center portion.

5. The recliner mechanism of claim 4 wherein the first plate has a set of guide features that extend toward the second plate, wherein each member of the set of pawl guide slots is disposed between a pair of guide features such that a support surface extends from each guide feature to one of the side surfaces.

6. The recliner mechanism of claim 2 wherein the first plate has a protrusion that extends into the center portion of the through hole and the cartridge has a recess that receives the protrusion.

7. The recliner mechanism of claim 2 wherein the cartridge has a body that is received in the center portion and a set of arms that extend radially outward from the body, wherein each member of the set of arms is received in a corresponding member of the set of cartridge receiving slots.

8. The recliner mechanism of claim 7 wherein each member of the set of arms engages the first plate to inhibit rotation of the cartridge about the axis with respect to the first plate.

9. A recliner mechanism comprising:
   a first plate that defines a through hole and that has a pawl guide slot disposed adjacent to the through hole;
   a second plate that is rotatable about an axis with respect to the first plate;
   a cartridge that is a separate component from the first plate and is received in the through hole, the cartridge having a pawl spring slot that is spaced apart from the first plate;
   a pawl that is disposed between the first plate and the second plate, wherein the pawl is received in the pawl guide slot; and
   a pawl spring that is received in the pawl spring slot such that the pawl spring is configured to exert a biasing force on the pawl.

10. The recliner mechanism of claim 9 wherein the pawl spring is spaced apart from and does not engage the first plate.

11. The recliner mechanism of claim 9 wherein a mounting flange extends from the pawl spring slot, wherein the mounting flange is disposed on a first side of the first plate that faces away from the second plate.

12. The recliner mechanism of claim 11 wherein the mounting flange inhibits axial movement of the cartridge toward the second plate.

13. The recliner mechanism of claim 12 wherein the cartridge has a retention feature that inhibits axial movement of the cartridge away from the second plate.

14. The recliner mechanism of claim 9 wherein the cartridge has an inner wall that defines a cartridge through hole.

15. The recliner mechanism of claim 14 wherein the inner wall is disposed at an end of the pawl spring slot.

16. The recliner mechanism of claim 15 wherein the cartridge further comprises a first pawl spring retaining feature that extends from the inner wall and extends away from the axis, wherein the first pawl spring retaining feature retains the pawl spring in the pawl spring slot.

17. The recliner mechanism of claim 16 wherein the cartridge has an arm that is partially received in the through hole, wherein the arm partially defines the pawl spring slot and terminates at an outer wall that is disposed opposite the inner wall.

18. The recliner mechanism of claim 17 wherein the cartridge further comprises a second pawl spring retaining feature that extends from the outer wall toward the axis, wherein the second pawl spring retaining feature retains the pawl spring in the pawl spring slot.

19. The recliner mechanism of claim 18 wherein the pawl has a pair of spring pins that are positionable on opposite sides of the second pawl spring retaining feature.

20. The recliner mechanism of claim 9 further comprising a driver that is disposed between the first plate and the second plate and is rotatable about the axis to actuate the pawl, and a biasing member that exerts a biasing force on the driver to rotate the driver, wherein the biasing member is coupled to the cartridge.

* * * * *